Jan. 21, 1930.   E. J. VON PEIN   1,744,183
CASH REGISTER
Filed Feb. 3, 1922   4 Sheets-Sheet 2

Inventor
EDWARD J. VON PEIN
BY Carl Beust
and Henry E Stauffer
His Attorneys Jan. 21, 1930.                E. J. VON PEIN                  1,744,183
                               CASH REGISTER
                            Filed Feb. 3, 1922            4 Sheets-Sheet 3

Inventor
EDWARD J. VON PEIN
BY
His Attorneys

Jan. 21, 1930.　　　　E. J. VON PEIN　　　　1,744,183
CASH REGISTER
Filed Feb. 3, 1922　　　　4 Sheets-Sheet 4

Inventor
EDWARD J. VON PEIN
BY Pearl Beust
Henry E Stauffer
His Attorneys

Patented Jan. 21, 1930

1,744,183

UNITED STATES PATENT OFFICE

EDWARD J. VON PEIN, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed February 3, 1922. Serial No. 533,774.

This invention relates to improvements in cash registers and has more particular relation to the type of cash registers shown and described in Letters Patent of the United States issued to Thomas Carney, May 23, 1893, No. 497,860, and also in U. S. Letters Patent to Joseph P. Cleal, No. 718,565, issued January 13, 1903.

The general operation and construction of the machine shown in the present application are substantially like those of the machine shown in the Carney and Cleal patents.

The object of the present invention is to enable the proprietor of a store selling taxable goods to keep an account of the sale of all goods upon which there is placed a Government tax and also to keep an account of the proper tax which is collectible by the revenue department of the Government on the sale of such goods.

In the accomplishment of this object the machine is constructed to enable the proprietor to register simultaneously both the amount of the purchase and the amount of the proper tax to be applied thereto.

It is a further object of this invention to provide not only for the registration of the amount of the purchase and the amount of tax assessable on the purchase but also to make a printed record of the amount of the purchase, together with a symbol to indicate whether said amount was taxable or not.

With these and incidental objects in view, the invention consists in certain novel features of construction and combinations of parts, the essential elements of which are set forth in appended claims and a preferred form or embodiment of which is hereinafter described with reference to the drawings which accompany and form part of the specification.

The machine in general comprises depressible keys representing the amount of the purchase. In the present embodiment the keyboard comprises keys for registering amounts from 5¢ to 95¢ in multiples of 5¢, and also includes a "no sale" key.

Separate totalizers are provided whereby the amount of the tax and the amount of the purchase are registered separately and simultaneously on their appropriate totalizers.

The usual indicators for this type of machine are provided for all of the keys of the register so as to indicate to the public which of the keys has been operated.

Simultaneously with the registration of the purchase amount in its totalizer, the printing of this amount is effected by a printing mechanism upon a detail strip. This mechanism is so constructed that a symbol (in the present case the letter "T") is printed beside the amount of the purchase on transactions in which a tax has been collected, thus indicating which transactions were taxable.

Described in detail, the machine comprises a series of amount or purchase keys 15 and a "no sale" key 16 pivotally mounted upon a transverse rod 17 supported in side frames 18 and 19. Common to and resting on the rear ends of all of the amount keys and the no sale key is a key coupler 20 pivoted at 21 in the said side frames. This coupler is of a form well known in the art and is fully described in the aforesaid Carney and Cleal patents. Each of the purchase keys and the "no sale" key is provided with a notch 22 with which a lip 23, formed on the rear edge, of the key coupler, cooperates for a purpose well known in the art.

Figures 3, 4, 5, 6:
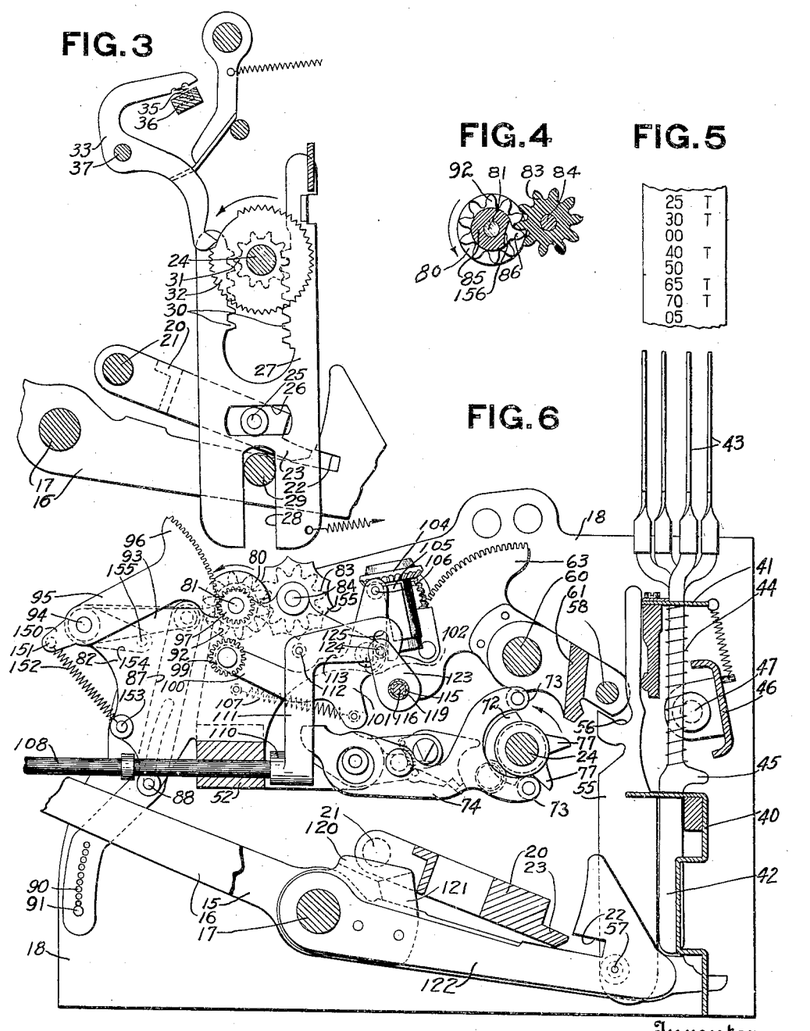
Fig. 3 shows the main operating shaft of the machine and its actuating mechanism.
Fig. 4 is a detail sectional view through the tax totalizer and shows the transfer mechanism thereof.
Fig. 5 is a fragmentary view of the detail strip printed by the machine.
Fig. 6 is a sectional view taken on the line 6—6 of Fig. 1.

Suitably mounted in the side frames 18 and 19 is a rotation shaft 24 which is given a complete rotation upon each reciprocation of the key coupler by the mechanism shown herein in detail in Fig. 3. At its right hand end the key coupler is provided with a stud 25 which projects into an elongated slot 26 formed in a vertical reciprocable double rack 27. At its lower end this double rack is provided with an open slot 28, receiving a stud 29 carried by the right hand side frame 19. At its upper end said rack is also slotted, and on the walls of the slot are oppositely facing teeth 30 which cooperate with a pinion 31 fast on the rotation shaft. This mechanism is substantially the same in construction and operation as the mechanism shown in the aforesaid Carney patent and for the accomplishment of the same purpose, that is, the giving of a complete rotation to the shaft 24 at each reciprocation of the key coupler, the rotation being in the direction of the arrow shown in Figs. 3 and 6.

Retrograde movement of the shaft 24 is prevented by a ratchet or full stroke disk 32 fast on said shaft in cooperation with a full stroke pawl or lever 33 pivoted at 37 to the frame of the machine and held in engagement with the ratchet 32 by a spring 35 seated in a lug 36 on the right hand side frame 19. It will thus be seen that upon each complete depression and return of a purchase key or a "no sale" key the key coupler will be reciprocated, and through the connections shown in Fig. 3 and above described a complete single rotation will be given to the shaft 24.

*Indicating mechanism*

Slidably mounted in guides 40 and 41 just above the rear end of each purchase key and the "no sale" key is an indicator rod 42 which carries on its upper end an indicator tablet 43 of a type fully shown and described in the hereinbefore mentioned Carney and Cleal patents. The indicator rods are held in their lowermost positions, resting upon the rear ends of the keys, by springs 44. Each indicator tablet bears a special character or characters corresponding to the character or characters appearing on the forward end of its appropriate key. When any key is depressed its indicator rod is elevated against the tension of said spring, thereby carrying its indicator tablet upwardly until a projection 45 carried by the indicator rod passes above a rocking bail 46 pivoted at 47 at each end to the side frames of the machine. The construction and operation of this bail are old and well known in the art and will not be described in detail here. Its purpose is to hold the indicator rods appropriate to the depressed keys in elevated positions between operations of the machine, thereby showing which keys were depressed in the previous operation. It will thus be seen that when any key is depressed the proper indicator tablet is raised and publicly exposed through the sight openings in the cabinet which are commonly provided in cash registers so as to indicate which of the keys has been operated.

Figure 1:
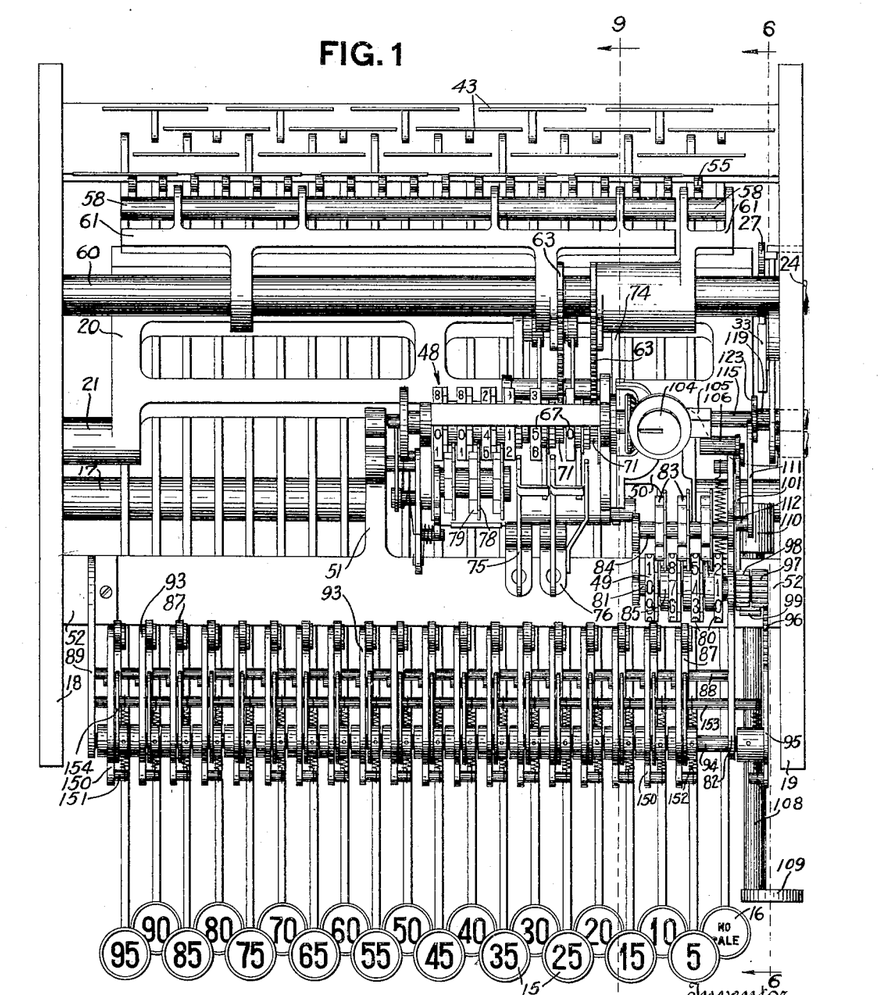
Fig. 1 is a top plan view of the assembled machine with the cabinet removed and shows the attachment in place.

As hereinbefore stated, the machine is provided with two totalizers 48 and 49. The totalizer 48 (Fig. 1) lies at the right hand end of the machine just above the keys. The totalizer 49 lies in front of the totalizer 48 and still farther to the right, as seen in Fig. 1.

The totalizer 48 will hereafter be known as the "purchase" totalizer, while the totalizer 49 will be called the "tax" totalizer. The purchase totalizer is pivotally supported by brackets 50 and 51 carried by a forward tie bar 52 constituting part of the frame of the machine.

As the general construction and operation of the "purchase" totalizer is clearly shown and described in Letters Patent of the United States to Carney, No. 532,762, issued Jan. 22, 1895, and 876,295, issued Jan. 7, 1908, and also a large number of prior patents, a brief description thereof is all that is believed to be necessary in connection with the present application.

Pivotally mounted at 57 (Fig. 9) on each of the purchase keys except the five-cent key is an upwardly extending actuator controller 55 formed near its upper end with a notch 56. The notches 56 of the various actuator controllers are located different distances from said pivotal points 57 to transmit graduated movements to the registering mechanisms of the machine as the various keys are operated.

Figures 7, 8, 9:
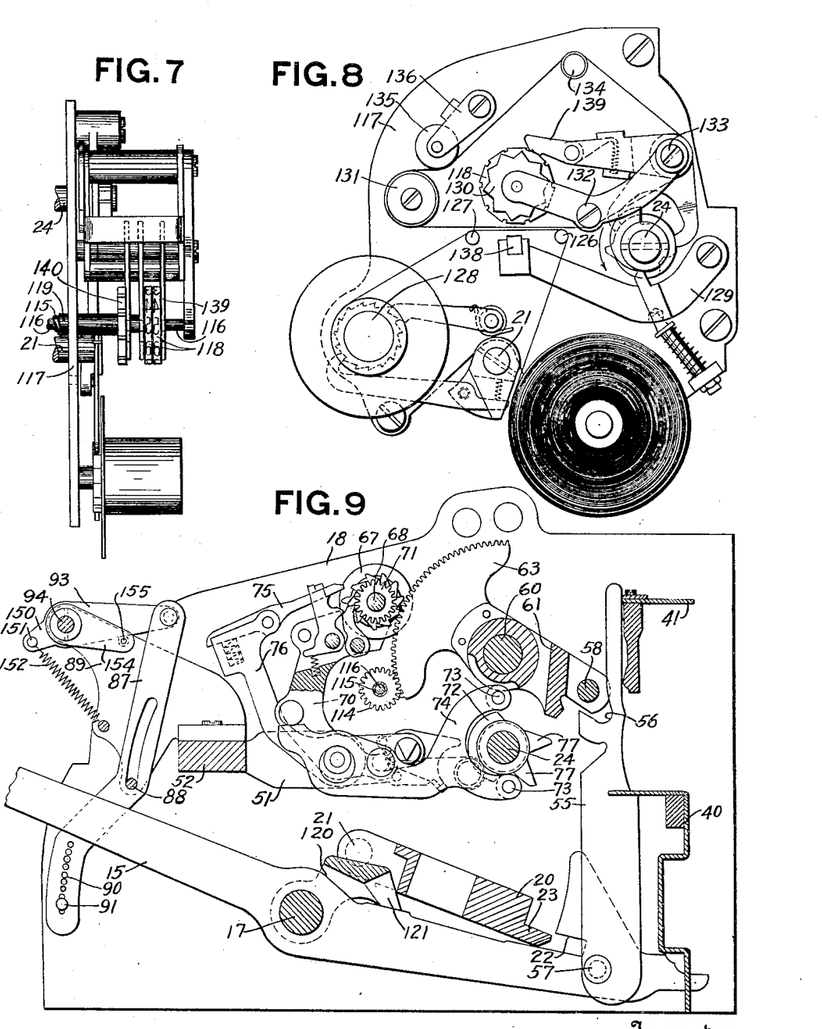
Fig. 7 is a top plan view of the printing mechanism with the ribbon omitted and with the record strip removed from the receiving roll.
Fig. 8 is a side elevation of the printing mechanism.
Fig. 9 is a sectional view taken on the line 9—9 of Fig. 1, with some of the parts omitted for the sake of clearness.

Referring to Fig. 9, the notch 56 of the actuator controller 55 is adapted to engage one of a series of cross rods 58. In this figure the key shown is the 20¢ key and its actuator controller 55 will therefore engage the cross rod 58 for the tens wheel of the "purchase" totalizer. The cross rods 58 are carried by rocking frames 61 (Fig. 1) pivotally mounted upon a rock shaft 60 supported in the side frames. In the present construction a rocking frame is provided which is common to all the purchase keys except the 5¢ key.

By reference to Fig. 1 it will be seen that two rocking frames 61 are provided for actuating the purchase totalizer 48, one for the units of cents wheel and the other for the tens of cents wheel. The 5¢ key controls one of said frames, the dimes keys the other, and the uneven multiples of five keys control both simultaneously. For example, if the 25¢ key is depressed, it will add 5¢ on the units of cents wheel and 20¢ on the tens of cents wheel.

Figure 10:
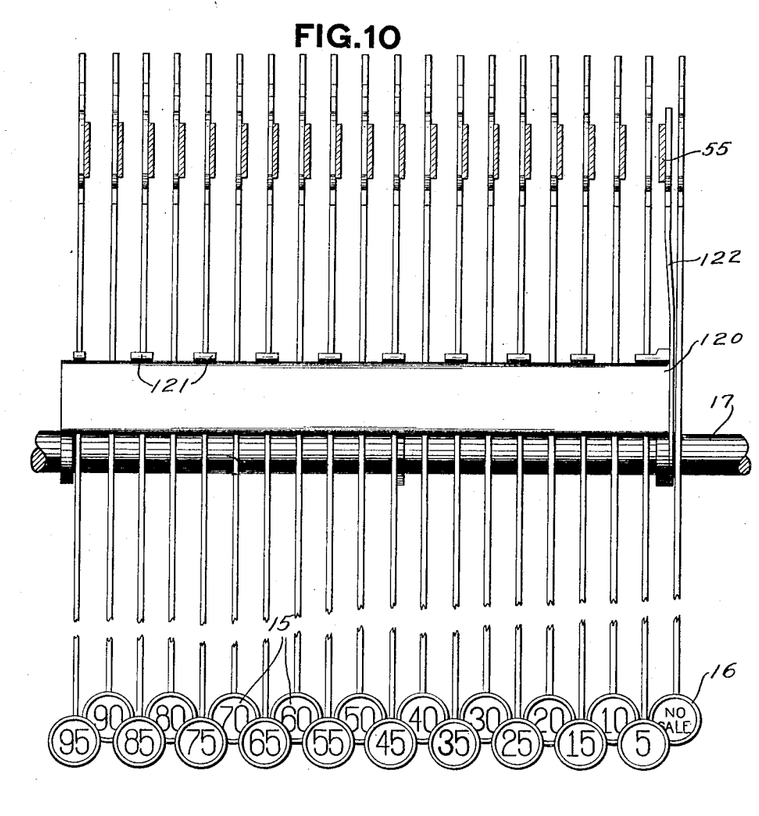
Fig. 10 is a detail top plan view of the keys, and shows the auxiliary key coupler.

For the purpose of accomplishing the result of adding on both lower order wheels of the purchase totalizer when a key representing an uneven multiple of five is depressed, the following construction is provided. This construction is fully illustrated and described in U. S. Letters Patent No. 683,877 granted to Thomas Carney, October 1, 1901, but will be briefly described herein as follows:

A frame 120 (Figs. 6, 9 and 10) is pivoted upon the key supporting rod 17, the horizontal portion of said frame lying just above the purchase keys to the rear of said supporting rod. The frame 120 is provided with downwardly extending lugs 121 which contact the 5¢ key and all of the keys representing uneven multiples of five. Fast on the right hand end of the frame 120 is a rearwardly extending arm 122 having pivoted near its rear end a vertical actuator controller 55 similar to the actuator controllers 55 above described. The actuator controller 55 carried by the arm 122 acts upon the units of cents frame 61 to rock it in the same manner as the actuator controllers 55 carried by the amount keys 15 act upon the tens of cents frame 61. When, for example, the 15¢ key is depressed, it will, through the actuator controller 55 carried by it, rock the tens of cents frame 61 one step so as to add a single unit on the tens of cents wheel of the totalizer, and will also rock the frame 120 and consequently move the actuator controller 55 carried by the arm 122 on the frame 120 to rock the units of cents frame 61 a distance of five steps so as to add "five" on the units of cents wheel of the totalizer. Any key representing an even multiple of five, i. e., "ten", "twenty", "thirty" and so on, will in its movement pass by the lugs 121 on the frame 120 and consequently will not move the frame 120. The 5¢ key cooperates with the frame 120 in the same manner as the keys representing uneven multiples of five.

The units of cents frame 61 is loose on shaft 60 and carries an actuator 63 to which is transmitted the rocking movements of the frame 120. The tens of cents frame 61, actuated by the keys other than the 5¢ key, is also loose on the rock shaft 60 (Fig. 9), and has fast thereto near its right hand end a similar actuator 63. It will thus be seen that when the various keys are operated the actuators 63 through the medium of the appropriate frames 61 are actuated according to the value of the keys which are depressed.

Purchase totalizer

The "purchase" totalizer is substantially identical in construction and operation with the totalizer shown in the first mentioned Carney and Cleal patents, but will be described briefly as follows:

The "purchase" totalizer comprises a plurality of totalizer wheels 67 rotatably mounted upon a shaft suitably supported in a rocking totalizer frame 70. The wheels bear numerals on their peripheries, the first wheel on the right having a zero and the numeral "5" diametrically opposite, and the tens wheel having the numerals running from 1 to 9 and 0, inclusive. In Fig. 1 it will be noted that the totalizer comprises six of such wheels. The two wheels of lower numerical order, that is, the two wheels to the right in Fig. 1, are each fastened to a pinion 71 normally in operative alinement with one of the registering segmental actuators 63.

Upon the rotation of the shaft 24, a cam 72 (Figs. 6 and 9) rigidly mounted thereon cooperates with anti-friction rollers 73 carried by a lever 74 connected to the rocking totalizer frame 70 to rock the totalizer pinions into mesh with the registering actuators 63 before any movement of said actuators takes place. This engagement of the pinions 71 with the registering actuators 63 is maintained throughout the downward movement of the outer ends of the keys. At the completion of such movement, which is the end of the receiving stroke of the keys, the cam 72 acts upon the lever 74 to disengage the pinions from the registering actuators. During the return movement of the keys and also during the consequent restoring movement of the registering actuators 63 the totalizer pinions remain disengaged so that the return movement of the actuators has no effect upon the totalizer elements.

Suitable transfer mechanism, comprising ratchet wheels and transfer disks fastened to the totalizer pinions, and transfer pawls 75 carried by rocking arms 76 which later are operated by cams 77 fast on the rotation shaft 24, is provided for performing the function of carrying from the totalizer elements of lower order to the elements of higher order at the proper time in the rotation of the totalizer elements. The well known Geneva transfer devices, comprising star disks 78 and gears 79, are employed to effect transfers between the wheels of higher order. These transfer mechanisms are old and well known in the art and are shown and fully described in the patent to Carney, No. 532,762.

Means is also provided for resetting the totalizer wheels to zero by rotating the shaft 68, but as this is old and well known it will not be described in detail herein.

"Tax" totalizer

The totalizer for registering the amount of tax appropriate to the various sales registered by the present machine is located to the right and in front of the "purchase" totalizer, as shown in Fig. 1. It consists of a plurality of totalizer wheels 80 rotatably mounted upon a shaft 81, supported by a bracket 82 carried by the tie bar 52. In order to transfer from wheels of lower denomination to wheels of higher denomination, there is provided a series of pinions 83 rotatably mounted on a shaft 84, also supported by the bracket 82. As shown in Fig. 4, each of the totalizer wheels 80 has fast thereto a hub 85 which carries a single tooth 86 adapted to mesh with the pinions 83. This tooth 86 is so positioned on the hub with reference to the numerals on the totalizer wheel associated therewith, that when the totalizer wheel passes from its "9" to its "0" position the single tooth 86 on hub 85 rotates the pinion 83 one step. This pinion is a broad pinion and also meshes with a pinion 92 fast to the totalizer wheel 80 of next higher denomination and therefore this totalizer wheel is also rotated one step upon the actuation of the pinion 83, by the single tooth 86 on hub 85. Secured to each pinion 83 is a disk 155 which cooperates with the hub 85 to prevent movement of said pinion except when a transfer takes place and then said disk cooperates with a notch 156 (Fig. 4) in the hub 85. This is the well known Geneva transfer mechanism.

The present machine is designed to register a tax of 1¢ for each 10¢ purchase or fraction thereof, and the means for giving the "tax" totalizer its proper extent of movement will now be described. As shown in Figs. 1 and 9, adjacent each amount key there is a link 87 slotted to receive a rod 88 suitably supported by the bracket 82, and a bracket 89 mounted on the tie-bar 52 at the left hand end of the machine. This rod 88 serves to guide the links 87 in their reciprocating movements. At their lower ends the links 87 are provided with a series of holes 90 in one of which there is a pin 91, the position of the pin depending upon the amount of the tax assessable against the amount represented by its corresponding key. In Fig. 6 the pin is shown in the lowermost hole, and with the pin in this hole 1¢ will be registered on the "tax" totalizer, while in Fig. 9 the pin is shown in the second hole from the bottom, and with the pin in this hole 2¢ will be registered. As the machine is to register a tax of 1¢ for each 10¢ or fraction thereof it is evident that the pin 91 will be in the same hole for more than one of the keys 15, that is, it will be in the second hole from the bottom for both the 15¢ and the 20¢ keys, as 2¢ is the tax appropriate to both of these amounts. When any one of the amount keys is depressed, it can be seen that as the pin 91 lies in the path of the key, the key contacts the pin 91 and moves the link 87 downwardly a number of steps, depending upon the location of the pin. It is clear from Figs. 6 and 9 that if the pin is in one of the upper holes in the link 87 the key contacts therewith sooner than it would if it were in one of the lower holes, and thereby imparts a greater movement to the link 87.

At their upper ends the links 87 are pivotally connected to arms 93 loose on a shaft 94 carried by the brackets 82 and 89. For the purpose of maintaining the links 87 in their normal raised position the arms 93 are provided with integral arms 150 carrying pins 151 to which are fastened springs 152 stretched from a rod 153 extending across the machine between brackets 82 and 89. Pinned to shaft 94 is a series of rearwardly extending arms 154, one for each of the arms 93, carrying pins 155 extending beneath the arms 93 and adapted to be operated thereby. This construction is necessary to prevent the hard key action which would result if the arms 93 were pinned to shaft 94, as the desired key would have to be depressed against the tension of all the springs 152. It can be seen from Figs. 6 and 9 that the depression of a key, through the contact of arm 93 with pin 155 on arm 154, rocks the shaft 94 an extent depending on the position of the pin 91 in the series of holes 90.

Fast to the extreme right hand end of the shaft 94 (Fig. 6), is an arm 95 having a segment 96 which meshes with a pinion 97 loosely mounted on the shaft 81 which supports the "tax" totalizer wheels. This arm is also provided with an extension 150, carrying a pin to which is secured a spring 152 also secured to the rod 153. The units wheel of the "tax" totalizer is mounted on a sleeve surrounding the shaft 81, said sleeve carrying at its opposite end a pinion 98 corresponding to the pinion 97. A broad pinion 99, carried by the forwardly extending arm 100 of a three-armed lever 101 pivotally mounted at 102 on the bracket 82, is adapted to couple the pinions 97 and 98 together in order to permit the movement imparted to pinion 97 by the segment 96 to be transmitted to the units totalizer wheel of the "tax" totalizer. The pinion 99 is normally in disengaged position, as shown in Fig. 6.

The "purchase" totalizer is normally disengaged from its actuators 63 but is rocked into engagement therewith, by means previously described, at the end of the down stroke of any of the keys. This rocking movement of the "purchase" totalizer is utilized to rock the broad pinion 99 into engagement with pinions 97 and 98 in order to make the "tax" totalizer effective. This function is accomplished in the following manner.

The "purchase" totalizer carries at its right hand end a lock barrel 104 into which a key is adapted to be inserted for the purpose of turning the totalizer wheels to zero. The lock barrel 104 carries an extension 105 (Figs. 1 and 6), the forward surface of which is flat, and cooperates with a roller 106 carried by an upwardly extending arm of the three-armed lever 101. This three-armed lever 101 constantly tends to move in a clockwise direction (Fig. 6) under the influence of a spring 107 extending between a pin on one of its arms and a pin projecting from the bracket 82. This clockwise movement of the lever is prevented, however, by the engagement of the roller 106 with the flat surface of the extension 105 and therefore the broad pinion 99 carried by the lever is held disengaged from the pinions 97 and 98 while the machine is at rest. When, however, at the beginning of a downward stroke of any of the keys, the "purchase" totalizer is rocked clockwise (Figs. 6 and 9) about its pivot to bring the pinions thereof into engagement with their actuators 63, the lock barrel 104 carried by the "purchase" totalizer is moved away from the roller carried by the lever 101 (Fig. 6) and the spring 107 moves the broad pinion 99 into engagement with the pinions 97 and 98. At the beginning of the return or upward movement of the keys the "purchase" totalizer is disengaged from its actuators 63, and this movement, through engagement of the roller 106 with the extension 105 of the lock barrel 104, rocks the lever 101 counter clockwise (Fig. 6), thereby disengaging the broad pinion 99 from pinions 97 and 98.

It will thus be seen that in operations in which a tax is to be registered the movement of the "purchase" totalizer into engagement with its actuators 63 renders the "tax" totalizer effective to receive the movement imparted to its actuator 96 by the depression of the amount keys 15.

"No tax" key

Figure 2:
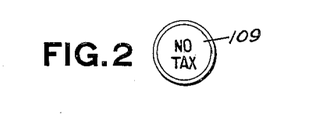
Fig. 2 is a front elevation of the key at the extreme right of Fig. 1, which is for the purpose of disabling the tax totalizer.

As the present machine is designed to register purchases on which there is no tax, as well as those which are taxable, it is necessary to provide some means for disabling the "tax" totalizer when one of these purchases is to be registered. In order to accomplish this function there is provided a "No tax" key in the form of a push rod 108 (Figs. 1 and 6) located at the extreme right of the machine and slidably mounted in the tie bar 52. At its forward end the push rod has a circular head 109 (Figs. 1 and 2) on which the words "No tax" appear. At its inner end the push rod is surrounded by a sleeve 110 having an upwardly extending arm 111 which, at its upper end, carries a pin 112. When it is desired to disable the "tax" totalizer the push rod is pushed in. This movement brings the pin 112 over a flat surface 113 on the three-armed lever 101. With the pin 112 in this position it is impossible for the lever 101 to rock clockwise to bring the broad pinion 99 into engagement with the pinions 97 and 98 to render the "tax" totalizer effective.

Printing mechanism

The machine shown in the present invention is adapted to print the amount of the purchase, together with a symbol to indicate upon a detail strip (as shown in Fig. 5) whether or not the purchase was taxable. With the exception of the means for controlling the printing or non-printing of the symbol above mentioned, the printing mechanism shown herein is old and well known in the present art as shown by the Cleal Patent, No. 718,565, and therefore but a very brief description thereof will be included herein.

As shown in Fig. 9, pinions 114 mesh with each of the actuators 63 for the "purchase" totalizer. The units pinion is mounted on the left hand end of a sleeve 115 surrounding a shaft 116 which carries the tens of cents pinion. This sleeve and shaft extend to the right (Fig. 1) through the machine side frame 19 and a printer side frame 117 (Fig. 7) and at their right hand ends carry type wheels 118. There is an additional sleeve 119 surrounding the sleeve 115 and having mounted on its extreme right hand end a type carrier 140 which carries the above mentioned symbol, in this case represented by the letter "T". At its left hand end the sleeve 119 carries an arm 123 (Figs. 1 and 6) which in turn carries a pin 124 projecting through a slot 125 in a rearwardly extending portion of the arm 111 carried by the inner end of the push rod 108, which is pushed rearwardly when it is desired to disable the "tax" totalizer. The symbol on the type carrier is in printing position when the "no tax" push rod is in its outer position. When the push rod is moved rearwardly the mechanism described moves the symbol out of printing position.

As is well understood in the art, the actuators 63 for the "purchase" totalizer, by means of pinions 114, shaft 116 and sleeve 115, set up the type carriers 118 to print the amount registered on the totalizer. This amount is printed on a detail strip (Fig. 8) led from a storage roll, around two rollers 126 and 127, to a receiving roll 128. This receiving roll is given one step of movement at each operation of the machine by means operated from the key coupler. The impression is made by an impression block 138 carried by a hammer 129 actuated at the proper time by a cam on the shaft 24 to take an impression on the detail strip from the type carriers 118 and 140. Spring-pressed alining pawls 139 also operated by a cam on said shaft cooperate with star-shaped disks 130 secured to the type carriers 118 and 140 to properly aline them before the impression is taken. A continuous ink ribbon passes from an ink roller 131 beneath the type carriers about rollers 132, 133 and 134 back to the ink roller 131. A roller 135, carried by a pair of arms 136, maintains proper tension upon the ink ribbon.

*Operation*

In the operation of the present machine all that it is necessary for the operator to do in order to register the amount of a sale and the proper amount of tax therefor is to depress the key appropriate to the amount of the sale. Supposing, for example, that a purchase of 25¢ has been made; the operator will depress the 25¢ key. This depression, by means of the actuator controller 55 and the actuator 63 registers 20¢ on the tens totalizer wheel of the "purchase" totalizer. As 25 is an uneven multiple of 5 the depression of the 25¢ key, through the frame 120, also operates the actuator controller 55 appropriate to the units frame 61 and thereby adds 5¢ to the units totalizer element of the "purchase" totalizer, making a total of 25¢ registered in this totalizer. If this is a taxable sale the tax on 25¢ is 3¢ and upon the depression of the 25¢ key, the key strikes the pin 91 positioned in the third hole from the bottom in its appropriate link 87 and the link 87 is moved downwardly three steps. This downward movement of the link 87 is transmitted to the segment 96 by means of the arm 93, arm 154, and shaft 94. Assuming that this is a taxable sale, the push rod 108 is not pushed in, the broad pinion 99 engages the pinions 97 and 98 upon the depression of the amount key, thereby permitting the segment 96 to register 3¢ upon the "tax" totalizer. If, on the other hand, the sale is not a taxable one, the push rod 108 is pushed in, thereby moving the symbol "T" in the type carrier away from its printing position and preventing the broad pinion 99 from connecting the pinions 97 and 98.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow:

What is claimed is:

1. In a machine of the class described, the combination of a plurality of accounting elements, an amount determining lever having a body portion, means carried by said lever for operating one of said accounting elements, and means adapted to be engaged by the body portion of said lever for operating another of said accounting elements an unlike amount.

2. In a machine of the class described, the combination of an accounting element, a manipulative amount determining means, means cooperating with one end of said amount determining means for operating said accounting element, said second mentioned means being disconnected from said accounting element when the machine is at rest, and means operated by the other end of said amount determining means for operatively connecting said accounting element and said second mentioned means.

3. In a machine of the class described, the combination of two totalizers, a pivoted key, means actuated by the rear end of said key for actuating one of said totalizers, and means actuated by the body portion of the forward end of said key for actuating the other of said totalizers an unlike amount.

4. In a machine of the class described, the combination of a plurality of accounting elements, differential actuators therefor, means for operatively connecting one accounting element to its actuator, means for operatively connecting another accounting element to its actuator, and means on one of said accounting elements for controlling the effectivity of the means for operatively connecting the other accounting element to its actuator.

5. In a machine of the class described, the combination of a totalizer, a plurality of pivoted keys, a plurality of vertically reciprocable members carrying differentially positioned pins projecting into the respective paths of said keys to be moved differentially thereby, a series of arms, one connected to each of said vertically reciprocable members, a shaft upon which said arms are loosely mounted, another series of arms fast on said shaft and adapted to be actuated by said first mentioned series to move the shaft differentially, and means for transmitting the differential movement given said shaft to said totalizer.

6. In a machine of the class described, the combination of two totalizers, separate actuating means therefor, means for moving one totalizer into engagement with its actuating means, and means bearing on said one totalizer and adapted upon movement of said totalizer to render the actuating means for the other totalizer effective.

7. In a machine of the class described, the combination of a totalizer and totalizer actuators relatively movable for engagement and disengagement, a second totalizer and actuating means normally disconnected, and means operable by the first mentioned totalizer, upon effecting engagement between the first mentioned totalizer and its actuators to operatively connect said second mentioned totalizer and its actuating means.

8. In a machine of the class described, the combination of a totalizer, actuators therefor normally out of engagement therewith, another totalizer, an actuator for the second mentioned totalizer normally out of operative relation therewith, means for bringing the first mentioned totalizer into engagement with its actuators, and means under control of the first mentioned totalizer for rendering the actuator for the second mentioned totalizer effective.

9. In a machine of the class described, the combination of a totalizer, actuating means therefor normally out of operative relation therewith, another totalizer, an actuator for the second mentioned totalizer normally out of operative relation therewith, means for bringing the first mentioned totalizer into operative relation with its actuating means, means under the control of the first mentioned totalizer for rendering the actuator of the second mentioned totalizer effective and for subsequently rendering said last mentioned actuator ineffective.

10. In a machine of the class described; the combination of a plurality of totalizers; an amount key; and separate means controlled by distinct portions of said amount key, for entering amounts in the respective totalizers, one of such separate means adapted to enter an amount in one of the totalizers unlike the amount entered in another totalizer by another of such separate means.

11. In a machine of the class described, the combination of a plurality of totalizers, manipulative amount determining means common to said totalizers, and separate and distinct means for transmitting movement from said amount determining means to each of said totalizers, one means being adapted to transmit a different extent of movement to one totalizer from the extent of movement transmitted by the other means to the other totalizer.

In testimony whereof I affix my signature.

EDWARD J. VON PEIN.